United States Patent Office.

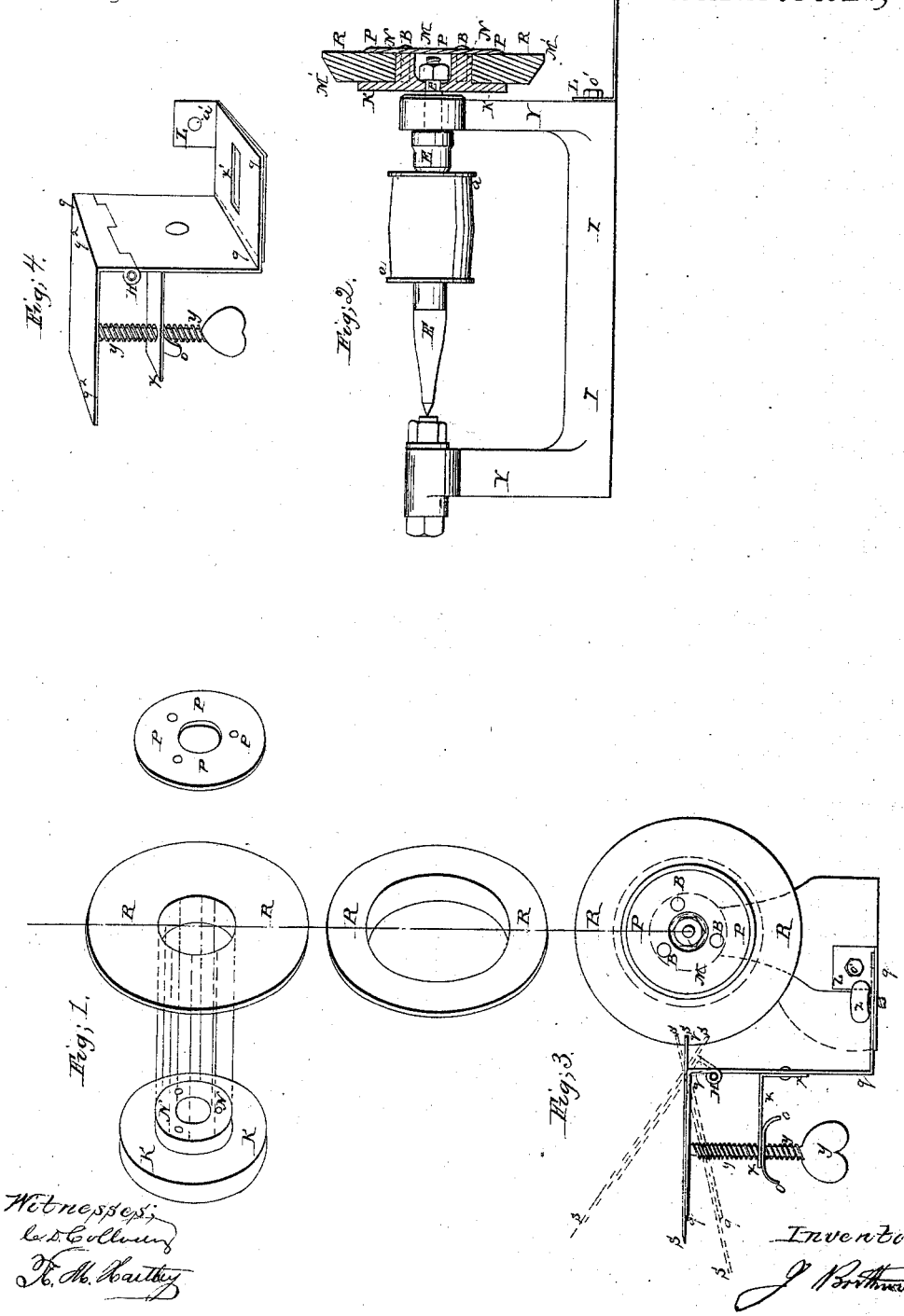

IMPROVED MACHINE FOR SHARPENING SAWS.

JOHN BORTHWICK, OF PHILADELPHIA, PENNSYLVANIA.

Letters Patent No. 59,950, dated November 27, 1866.

SPECIFICATION.

TO ALL WHOM IT MAY CONCERN:

Be it known that I, JOHN BORTHWICK, of the city and county of Philadelphia, in the State of Pennsylvania, have invented a new and improved mode of Sharpening Saws; and I do hereby declare that the following is a full, clear, and exact description of the construction and operation of the same, reference being had to the annexed drawings making a part of this specification, in which—

Figures 1 and 1 (bis) are a perspective view of my solid emery ring or rim, R, and flange, K, and metallic ring washer, P.

Figure 2 is a side elevation of the whole saw sharpener, showing a sectional elevation of my emery ring or rim as held by flange K, and plate or washer P.

Figure 3 is an end elevation of the saw sharpener, showing in full my emery ring or rim, R, and also my improved rest, by means of which, as will be hereafter described, the saw can be presented to the emery ring or rim in any desired position, as shown by the red lines, (fig. 3.)

Figure 4 is a perspective view of my improved rest.

The nature of my invention and improvement consists in the use of solid emery rings or rims, instead of solid emery wheels or files, for sharpening saws, and of a hinged rest, which, by means of a screw acting under the rest's hinged top plate, permits to present the saw to the sharpening ring or rim at any desired angle or bevel; the whole arranged and operating as follows: I use a solid emery ring, R, or rim, R', which I place on flange K, made to fit into the inside of my ring or rim. On the opposite face of the ring or rim I place a metallic ring washer, P; and screws B B B, passing through said washer into flange K and in holes N, will hold the whole combination together, firm, steady, as one solid piece, and ready to be used on any mandrel, E, as shown in fig. 2, M' M'. The advantages of a solid ring or rim over the solid wheel are that it saves material, and is thus much cheaper, and permits, also, to use the ring until it is worn out to, say, one quarter of an inch of its inside periphery; whereas the solid wheel, past a certain point of wear, cannot be used at all. I also use a rest, which I term a "hinged rest," and which is made as shown in $g$, figs. 3 and 4. The top plate, $g^2 g^2$, of the rest is attached to the body of the same by means of ordinary hinges, H, and rest in any desired position on end of hand-screw $y\ y$; said screw passing and acting through lug $x\ x$, which is rivetted in proper place on head of rest $g$. The top of top plate $g^2 g^2$ must be on a level with centre of mandrel, E E, on which the sharpening ring or rim, prepared as above mentioned, has been attached, and when the teeth of the saw should be sharpened straight across, the top plate should stand horizontal or form a right angle with head of rest; but when said teeth have to be sharpened or bevelled at a certain angle, the screw, $y\ y$, should be screwed or unscrewed so as to bring the top plate to the desired angle, after which operation any hand, however inexperienced, I may want to employ—a child, even—will be able to use the rest to advantage and sharpen the saw to the desired angle. To the bed plate D D of head Y Y, (fig. 2,) I attach a plate, L, by means of screws $o'$; said plate to be the bed plate, on to which I place and fasten my rest, as shown in figs. 3 and 4, by means of hand-screw $z$. Said screw passes through slot $z'$, fig. 4, so as to allow the whole rest to be placed at any desired distance from the periphery of the emery ring or rim. I scarcely need mention that, like any other grinding or sharpening wheels, my emery ring or rim is made to revolve with velocity by means of a belt passing on pulley $a\ a$, and connecting the sharpener with suitable motive power. Two main advantages are derived from my improvements. Economy, by using a solid emery ring or rim, which can be obtained at a lesser cost and used up to the very edge. Time saving, in that with my hinged rest a child or any inexperienced hand can use the sharpener to advantage.

Having thus described my invention, what I claim as new, and desire to secure by Letters Patent, is—

1. The solid emery ring or rim, of any suitable size, for the purpose of sharpening saws, combined with flange K and plate P, and arranged substantially as herein described.

2. The combination of the hinged rest, $g$, constructed as described, with screws $y\ y$, and bed plate L, for the purpose as above described.

3. The combination of the emery ring with the rest, screws, and bed plates as herein described and set forth.

J. BORTHWICK.

Witnesses:
C. D. COLLADAY,
R. M. HARTLEY.